July 19, 1960

D. KALISH 2,945,941

RESETTABLE WELDER

Filed Jan. 23, 1957

INVENTOR.
DAVID KALISH
BY
Woodling and Krost
atty.

July 19, 1960 D. KALISH 2,945,941
RESETTABLE WELDER
Filed Jan. 23, 1957 6 Sheets-Sheet 4

INVENTOR.
DAVID KALISH
BY Woodling and Krost,
attys.

Fig.9A

INVENTOR.
DAVID KALISH

Fig.9B

United States Patent Office 2,945,941
Patented July 19, 1960

2,945,941

RESETTABLE WELDER

David Kalish, Alliance, Ohio, assignor to The Alliance Manufacturing Company, Division of Consolidated Electronics Industries Corporation, Wilmington, Del.

Filed Jan. 23, 1957, Ser. No. 635,799

20 Claims. (Cl. 219—124)

The invention relates in general to electrical welders and more particularly to welders which may be automatic or semi-automatic and which use consumable electrodes wherein such electrodes are reset periodically to maintain a predetermined location of the ends of the electrodes.

The prior art has known automatic welders for successively welding workpieces presented at a welding station, but generally these welders have used electrodes which are not consumed in the welding process; and hence, the welding of successive workpieces may take place without fear of the machine getting out of adjustment.

When consumable electrodes are used, however, such as carbon electrodes, such electrodes are gradually consumed during the successive welding cycles; and hence, the welding conditions will change as the arc lengthens.

The present invention, therefore, relates to a cycling welder especially for use with consumable electrodes for welding successive workpieces presented at a welding station wherein means is provided for maintaining the electrodes under substantially constant conditions and at a substantially constant location relative to the workpiece in order to have uniform successive welds.

An object of the invention, therefore, is to provide a welder having means for resetting consumable electrodes used in the welding process.

Another object of the invention is to provide a welder having combined gauging and resetting means which may periodically be used to gauge and reset the position of the ends of welding electrodes.

Another object of the invention is to provide a welding station whereat successive workpieces are presented for welding and which are positioned at a predetermined spaced distance from the end of an electrode, with this predetermined spaced distance being periodically gauged and periodically reset both during a time when there is no welding current flow from the electrodes to the workpieces.

Another object of the invention is to provide a synchronizing means which synchronizes the action of welding cycles and resetting cycles so that the resetting cycles do not occur during the welding cycles but only between two successive welding cycles.

Another object of the invention is to provide an automatic welder wherein a sequence means is provided for sequentially moving workpieces to a welding station and moving welded workpieces away from the welding station with a synchronizing means being provided to cause actuation of gauging and resetting means only during actuation of the sequence means.

Another object of the invention is to provide an automatic welder for welding copper wire shading coils on a permeable core by a consumable electrode welder with movable jaws to hold the electrodes and a movable lever to hold gauges for gauging the position of the electrodes, with a power means being linked first to position the gauges under the electrodes and second to open the jaws holding the electrodes for resetting same and then to subsequently close the jaws and withdraw the gauges.

Another object of the invention is to provide a device to detect when an electrode is not in position ready for welding and accordingly to interrupt the flow of welding current.

Other objects and a fuller understanding of this invention may be had by referring to the following description and claims, taken in conjunction with the accompanying drawing, in which:

Figure 5:
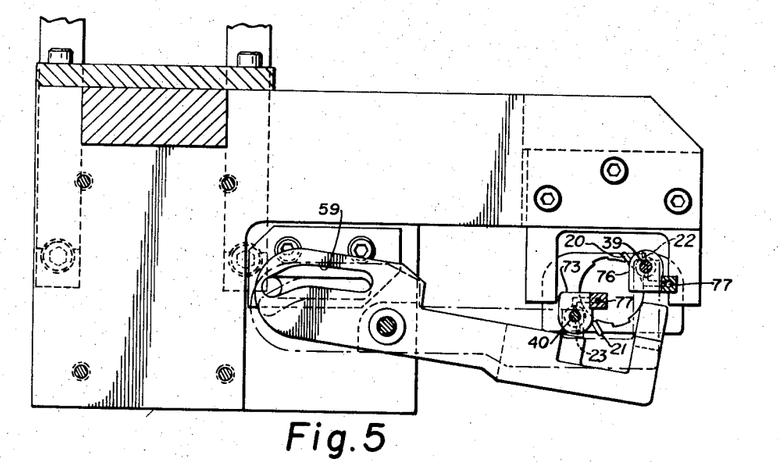
Figure 9A:
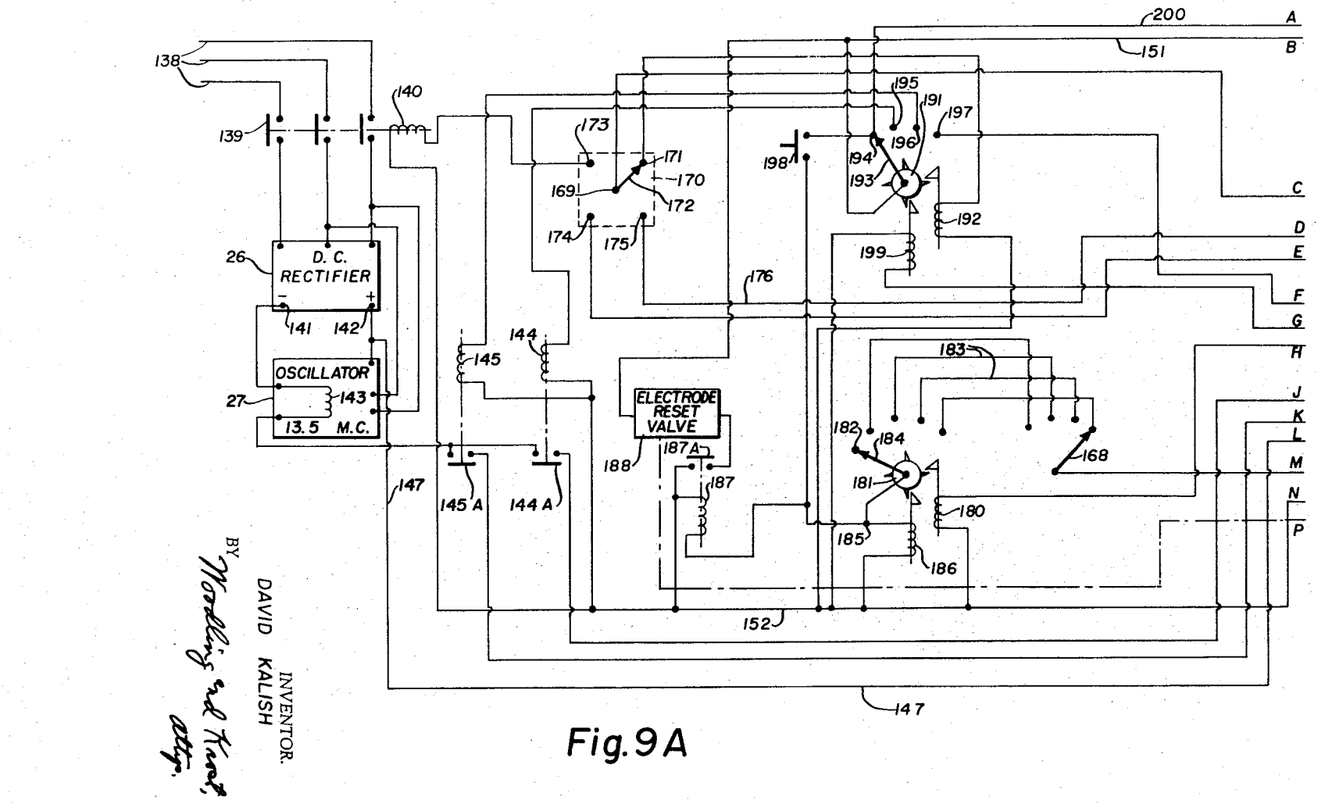
Figure 9 is a combined electrical schematic diagram of the welder circuit and a diagrammatic view of the entire welder incorporating the invention.
Figure 9B:
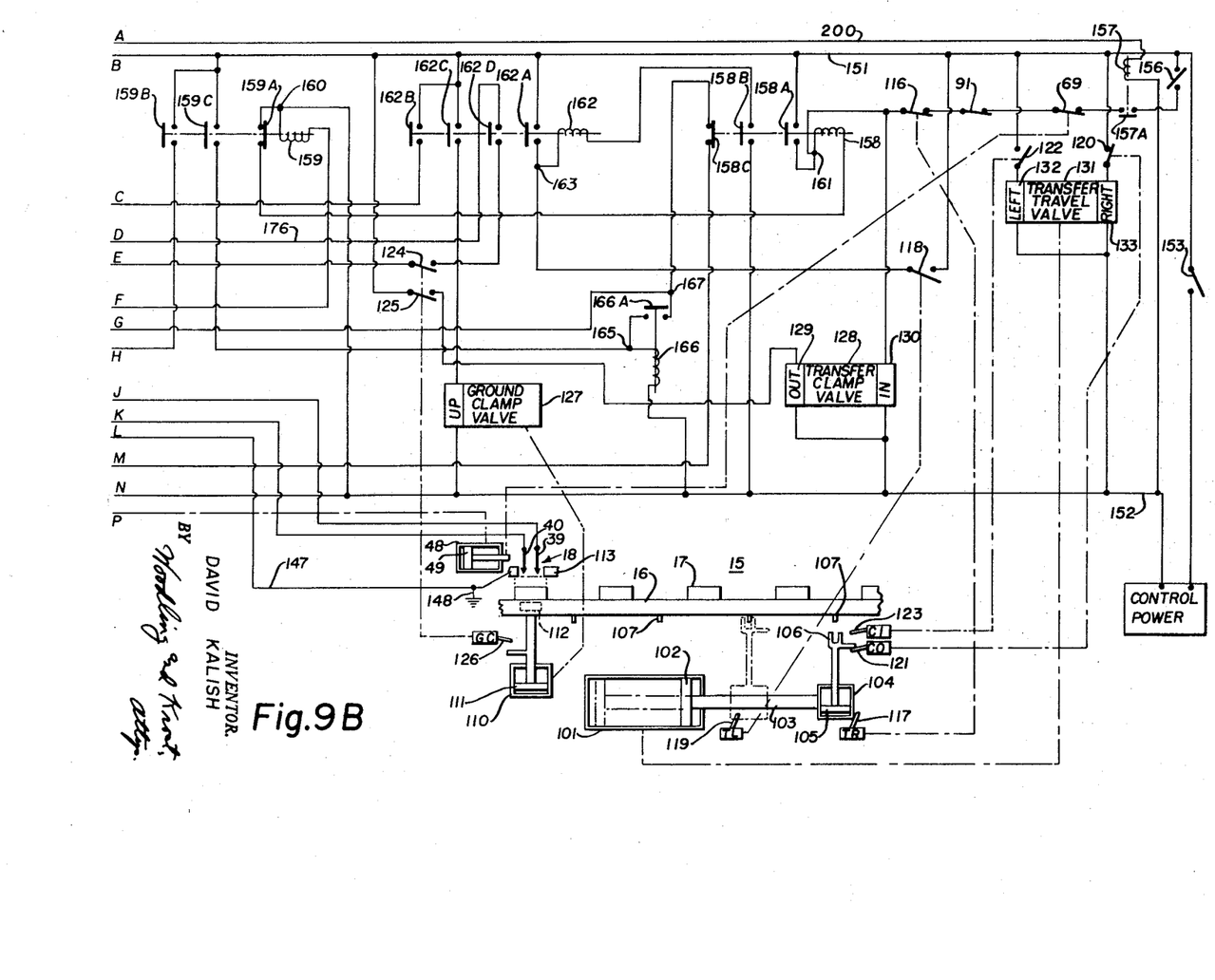

The Figure 9 shows diagrammatically the complete automatic welder 15 which may be used for cycling in a semi-automatic or automatic manner for welding of successive workpieces. A conveyor 16 of any desired configuration is partially shown in Figure 1 and diagrammatically shown in Figure 9 for conveying successive cores 17 to a welding station 18 shown in Figure 1. The cores 17 have been shown for purposes of illustration as the laminated permeable stator of a fractional horsepower shaded pole induction motor, and the shading coils 20, 21, 22, and 23 are made of copper wire and are those which constitute the workpieces to be welded in the welder 15. Figure 5 shows such cores 17 carrying the four shading coils 20–23. A pair of shading coils 22 and 23 are those to be welded at the welding station 18; and the other two shading coils 20 and 21, which are shown of larger diameter, are welded by some other means not shown which may be another welding station similar to that shown in 18 positioned elsewhere along the conveyor 16. The mechanism for welding the two shading coils 22 and 23 is believed to describe the novel features of the invention without further reference to the mechanism for welding the other two shading coils 20 and 21.

The Figure 9 shows diagrammatically that the welder 15 operates from a welding current source 26 which in this case is shown as a direct current rectifier type of welder and also utilizes a high frequency oscillator 27 to strike a leader arc from the ends of the electrodes to the workpieces 22 and 23. In this particular case the leader arc caused by oscillator 27 is used because the ends of the electrodes are physically spaced from the shading coils 22 and 23 during the actual welding operation and at all times. The Figure 9 shows the welding current source 26 and the oscillator 27 to be connected in series for a combination of direct current and high frequency to be applied to the welding electrodes. This means that the various parts of the welder, and especially those parts at the welding station 18, must be insulated for high frequency voltages.

The Figures 1 to 6 show the details of construction of the welding station 18 which has a base 30 which slideably carries a vertically adjustable stand 31. This stand 31 is adjustable to different predetermined positions by means of a hand screw 29 so as to move the entire stand and parts carried thereby to different vertical positions relative to the base 30. An insulated plate 32 is carried on the stand 31, and fixedly attached to this insulated plate 32 are first and second electrode holders 33 and 34. The electrode holder 33 has a fixed jaw 35 and a movable jaw 36, and similarly the electrode holder 34 has fixed and movable jaws 37 and 38. The insulated plate 32 and the electrode holders 33 and 34 are disposed generally horizontally in this preferred embodiment with the jaws having recesses to support first and second electrodes 39 and 40 in a generally vertical position. The first electrode 39 is for cooperation with the shading coil 22 and the second electrode 40 is for cooperation with the shading coil 23 when a core with such shading coils thereon is positioned at the welding station 18.

The movable jaws are pivoted at 41 and have a rearward extension 42 carrying rollers 43. These pivoted jaws are urged to the closed position, that is, a position clamped upon the respective electrodes by springs 44.

The stand 31 carries a pneumatic cylinder 48 housing a piston 49 which actuates a piston rod 50, and the forward end 51 of the piston rod becomes a plunger to act upon the rollers 43 to separate same and hence open the electrode holders whenever the plunger 51 is advanced to a position between the rollers 43.

Figure 1:
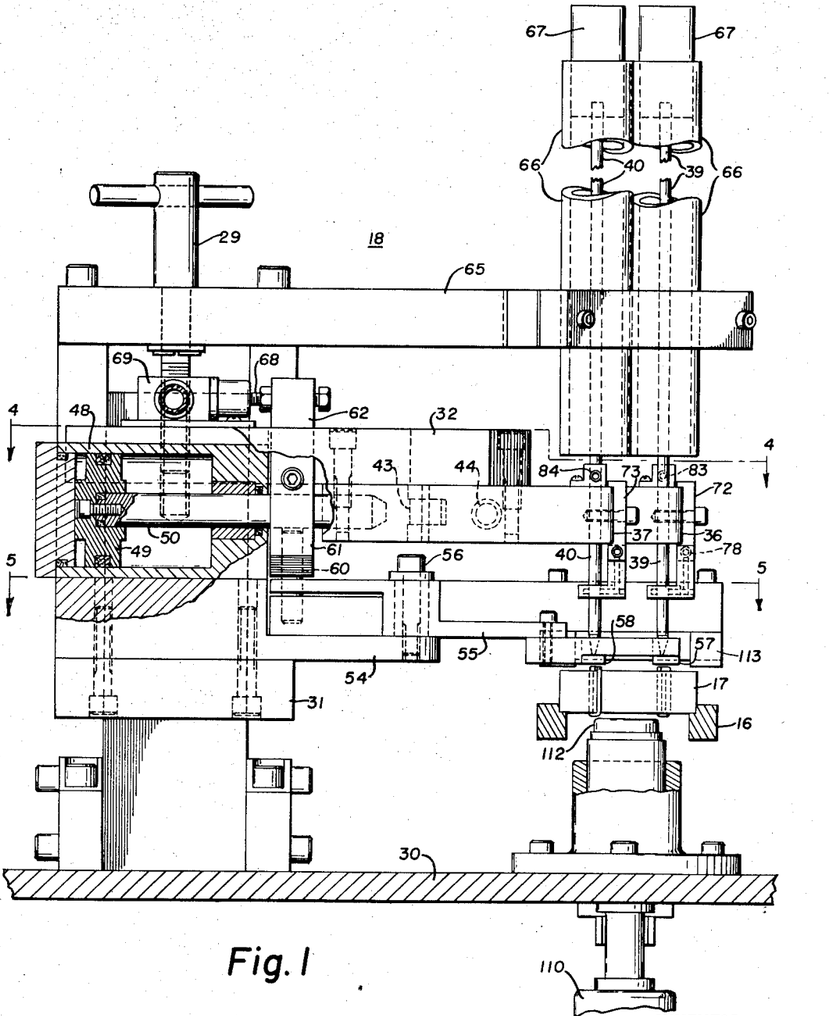
Figure 1 is a side elevation of a welding station incorporating the invention.
Figure 4:
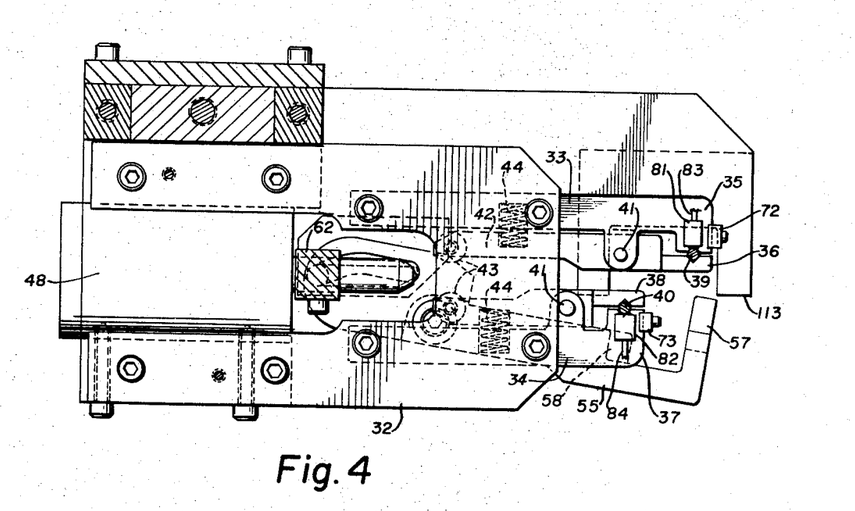
Figures 4 and 5 are sectional views on the lines 4—4 and 5—5 of Figure 1.

An arm 54 extends forwardly from the stand 31, and a pivoted lever 55 is pivoted at 56 to the arm 54. The forward end of the lever 55 carries first and second gauges 57 and 58 for cooperation with the first and second electrodes 39 and 40, respectively. The rearward end of the lever 55 has a curved slot 59 in which a pin 60 is engaged, with the pin 60 being carried on a vertical arm 61 as a part of a linkage 62 from the piston rod 50 to the pivoted lever 55. The Figures 1, 4, and 5 show the piston 49 retracted, that is, in the left-most position, which is the normal position during welding at the welding station. However, when the piston 49 is actuated to the right, first the pin 60, moving in the slot 59, pivots the lever 55 counterclockwise, as viewed in Figure 5, in about half the travel, and then in the next half of its travel the plunger 51 engages the roller 53 to open the jaws of the electrode holders 34 and 35. During the first part of this movement, the pivoted lever 55 which is a gauging means moves from the solid line position of Figure 5 to the dot-dash position whereat the gauges 57 and 58 are positioned vertically below the electrodes 39 and 40. Then during the second half of the rightward movement of piston 49, the jaws of the electrode holders open to permit the electrodes 39 and 40 to fall down onto the gauges 57 and 58. This is a resetting means to reset to a predetermined location the lower ends of the electrodes 39 and 40. Upon retraction of the piston 49, the opposite sequence takes place; namely, first the jaws of the electrode holders 34 and 35 close to again grip the electrodes 39 and 40 and then subsequently the gauging means retracts to the solid line position shown in Figure 5.

An upper arm 65 is carried on the stand 31 and this upper arm carries insulated tubes 66 which may be transparent to contain and guide the electrodes 39 and 40. Weights 67 may be used on the upper ends of the electrodes to make certain that these electrodes reset themselves during the gauging and resetting cycle by firmly engaging the gauges 57 and 58.

The insulated plate 32 may be U-shaped as shown especially in Figure 4 to permit passage of the linkage means 62 upward therethrough so that an adjustable abutment 68 on this linkage 62 may actuate a control switch 69.

Figure 7:
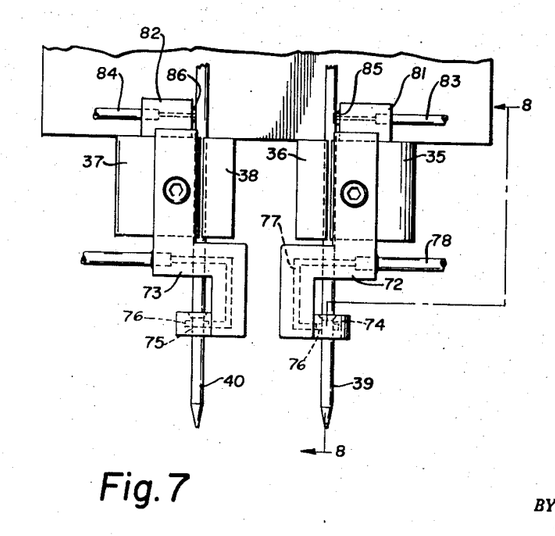
Figures 7 and 8 are enlarged partial views of an electrode support used in the welding station.
Figure 8:
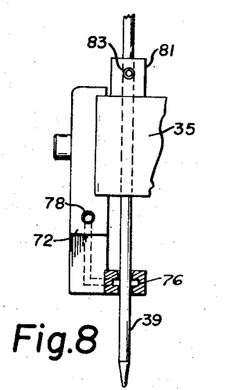

The Figures 7 and 8 show to an enlarged scale electrode supports 72 and 73 mounted on the outboard ends of the fixed jaws 35 and 37. Each of these electrode supports 72 and 73 curves around underneath the electrode holders 33 and 34 so that openings 74 and 75 are positioned vertically beneath the grooves in the jaws which engage the electrodes 39 and 40. As best shown in Figure 8, each of the openings has an annular recess 76 connected by an air passage 77 to an external tube 78 which is connected to a suitable source of compressed air. The tube 78 supplying air to the recess 74 provides air under pressure to the space completely surrounding each of the electrodes 39 and 40. This forms a jet of air around the electrode close to the lower end thereof to cool the electrode to an extent controlled by the air flow, and this controls the pointing of the consumable electrode which may be a carbon electrode, and this controlled pointing of the end of the electrode aids materially in consistent successive welds. During the actual welding it is preferable to shut off or reduce the air flow to prevent the splatter of copper and to permit welding to take place under electrode control only.

The Figures 1 and 4 show electrode detector blocks 81 and 82 mounted on the electrode holders 33 and 34, respectively. These blocks are supplied by compressed air through the tubes 83 and 84 and through an internal passageway blow air out of nozzles 85 and 86. These nozzles are positioned closely adjacent the electrodes 39 and 40 which electrodes act as a restriction to the flow of air whenever such electrodes are present in the holders.

Figures 2, 6, 10:
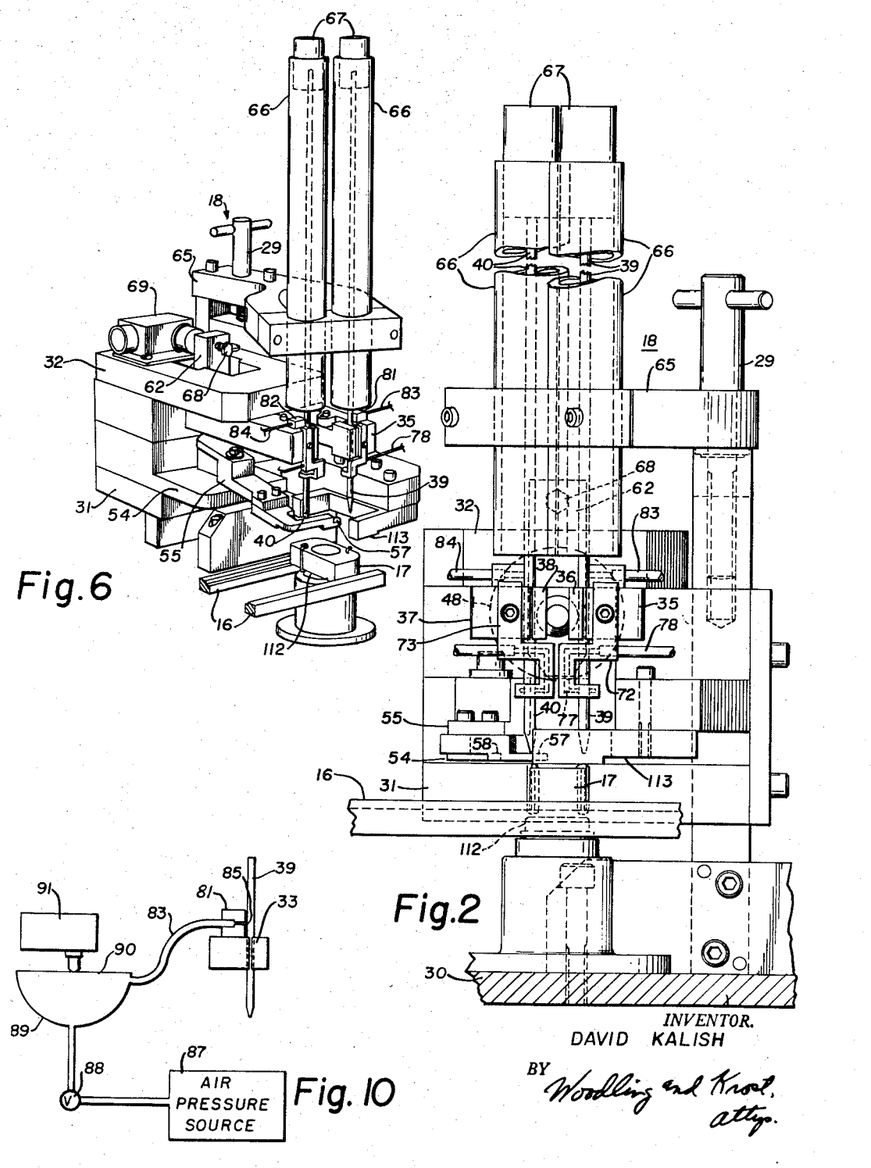
Figure 2 is a front elevation of the welding station.
Figure 6 is a perspective view of the welding station.
Figure 10 is a diagrammatic view of an electrode detector.
Figure 3:
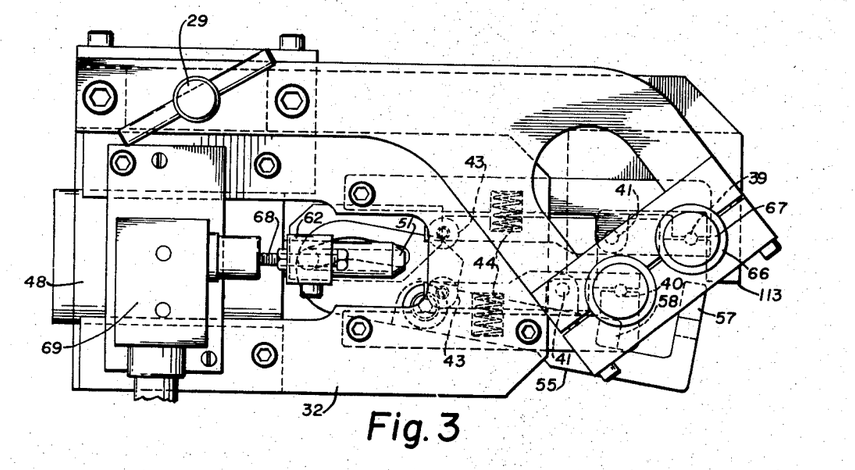
Figure 3 is a plan view of the welding station.

The Figure 10 shows diagrammatically one of the electrode detector blocks 81 mounted on the electrode holder 33 for cooperation with the electrode 39. Air is supplied from an air pressure source 87, preferably regulated through a needle valve 88 to a chamber 89 closed by a movable diaphragm 90 which actuates a switch 91. The chamber 89 is connected by the tube 83 to the electrode detector block 81. When an electrode is in the electrode holder so as to act as a restriction to prevent air flowing out of the nozzle 85, then air pressure builds up in the chamber 89 to actuate the switch 91 to the closed position.

The Figure 9 shows the schematic electrical diagram plus the pneumatic control of the conveyor 16 which is used as a part of the welder 15. A transfer cylinder 101 is mounted longitudinally of the conveyor 16 and contains a piston 102 to move a piston rod 103. A clamp cylinder 104 is connected to be moved by the piston rod 103, and this clamp cylinder 104 contains a piston 105 to move a clamp yoke 106 into and out of engagement with dogs 107 on the conveyor 16. A ground clamp cylinder 110 is mounted on the base 30, as also shown in Figure 1, and actuates vertically a piston 111 and plunger 112 which moves upwardly between spaced parts of the conveyor 16 to engage whatever core 17 is at the welding station 18. It moves such core upwardly into engagement with a grounding plate 113 which may be made of copper for good electrical conductivity, and which in this case is made U-shaped to engage two outer portions of the cores 17. The grounding plate 113 is fixedly carried on the arm 54.

The conveyor 16 is designed to move to the left, as viewed in Figure 9, to successively supply cores 17 to the welding station 18. In this particular embodiment shown the cores 17 are stators of fractional horsepower induction motors which carry copper wire preformed shading coils thereon. The shading coils are preformed to the extent that they have been bent to the required shape with abutted or overlapping ends closely spaced ready to be welded, and the shading coils which are the workpieces are presented at the welding station 18 so that the respective electrode is directly above the abutted ends of these workpiece shading coils.

The transverse cylinder piston 102 actuates a normally open transfer right switch 116 by means of a lever 117 and also actuates a normally open transfer left switch 118 by means of a lever 119. The clamp cylinder piston 105 actuates a normally open clamp-out switch 120 by means of a lever 121 and also actuates a clamp-in switch 122 by means of a lever 123. The piston 111 of the ground clamp cylinder actuates ganged normally open clamp-up switches 124 and 125 by means of a lever 126. A ground clamp valve 127 is solenoid operated to control air pressure from some source such as source 87 to control the ground clamp cylinder 110 in a conventional manner. A transfer clamp valve 128 is operated by out and in solenoids 129 and 130, respectively, with this valve 128 controlling out and in movements of the piston 105 of the clamp cylinder 104. A transfer travel valve 131 is controlled by left and right solenoids 132 and 133, and this valve 131 controls right and left movements of the transfer cylinder piston 102.

Three-phase power is supplied on power lines 138 through contacts 139 of power contactor 140 to the welding current source 26. The source 26 has output terminals 141 and 142 which supply direct welding current. The terminal 141 is connected through a pick-up coil 143 in the high frequency oscillator 27 to normally open contacts 144A and 145A of electrode selector contactors 144 and 145, respectively. The electrode 39 is connected through its electrode holder to contact 144A and the electrode 40 is connected through its electrode holder to the contact 145A. The source terminal 142 is connected by a lead 147 to ground 148 and to the grounding plate 113 so that it will be at ground potential and maintain the workpieces and cores at ground potential.

The Figure 9 schematically shows control lines 151 and 152 which may be connected to a source of control voltage such as one hundred fifteen volts alternating current through a control line switch 153. An on-off selector switch 156 is connected to control line 151 and leads through normally open contacts 157A of a time delay relay 157 to the control switch 69 which is an electrode reset retracted switch. The switch 69 is connected through the control switch 91 which is the electrode detector switch, and through the transfer right switch 116 to a terminal 161 at one end of a cycle trigger relay 158. The cycle trigger relay 158 is connected through normally closed contacts 159A of an electrode reset control relay 159 to a terminal 160. The terminal 160 is connected to the control line 152.

The cycle trigger relay 158 has a normally open hold-in contact 158A connected between line 151 and the terminal 161. Normally open contacts 158B are connected between control line 152 and a timer control relay 162, the other end of which is connected to a terminal 163. Normally open hold-in contacts 162A connect the terminal 163 to control line 151.

Normally open contacts 159C on relay 159 are connected between control line 151 and a terminal 165. A time delay relay 166 is connected between terminal 165 and control line 152. Normally open contacts 166A of the relay 166 are time delay closing contacts and are connected between terminal 165 and a terminal 167. Normally closed contacts 158C of relay 158 are connected between terminal 167 and an electrode reset selector tap switch 168. Switch 168 is a multi-position switch of any desired number of positions, and in this case a four-position tap switch has been shown merely for purposes of illustration.

Normally open contacts 162B of relay 162 are connected between control line 151 and a common terminal 169 of a timer 170 which may be a variable timer such as an electronic timer. The timer 170 has a normally closed contact 171 with which the timer switch blade 172 is normally engaged and has a normally open contact 173. The timer 170 has trip terminals 174 and 175 to be shorted to start the timer 170 which is constructed to throw the switch blade 172 to the normally open contact 173 for a predetermined time after which it times out and the switch blade 172 returns to the normally closed contact 171. The trip terminals 174 and 175 are interconnected by a lead 176 through normally open contacts 162D of relay 162 and through the ground clamp-up switch 124. Normally open contacts 162C of relay 162 are connected between control line 151 and the solenoid of the ground clamp valve 127, the other end of which is connected to control line 152. Normally open contacts 159B of relay 159 are connected between control line 151 and the stepping coil 180 of a stepping relay 181 and through this stepping coil 180 to the control line 152. This stepping relay 181 is a multi-position relay having any desired number of contacts and is shown as having an off contact 182 plus additional contacts equal in number to the number on the tap switch 168 to which like numbered contacts are interconnected by conductors 183. The stepping relay 181 has a switch blade 184 connected to a terminal 185, and a reset coil 186 of the relay 181 is connected between terminal 185 and control line 152. A time delay relay 187 is connected between terminal 185 and control line 152 with normally open contacts 187A of this relay 187 being quick closing and time delay opening type of contacts. The contacts 187A are connected between control line 152 and an electrode reset valve 188 which controls the pneumatic cylinder 48. The other end of the solenoid of valve 188 is connected to control line 151. The movement of the piston 49 in cylinder 48 controls actuation of the electrode reset retracted switch 69. A stepping relay 191 has a stepping coil 192 connected between the control line 152 and the normally closed contact 171 of timer 170. The stepping relay 191 has a switch blade 193 connected to control line 151 and adapted to contact a plurality of contacts shown as four in number in this particular embodiment of the invention. These four contacts are numbers 194 to 197, inclusive. A manual electrode reset push button 198 is connected between contact 194 and terminal 185. The electrode selector contactor 144 is connected between contact 195 and control line 152. The electrode selector contactor 145 is connected between contact 196 and control line 152. The electrode reset control relay 159 is connected between contact 197 and terminal 160 which is connected to control line 152. The stepping relay 191 has a reset coil 199 connected between control line 152 and terminal 167. The time delay relay 157 has one end connected to control line 152 and the other end connected by a conductor 200 to the contact 194 of the stepping relay 191.

*Operation*

It is assumed that three-phase power is available on the lines 138 to supply the rectifier 26 and oscillator 27 whenever the contacts of the power contactor 140 are closed. The operation can be described by assuming that a core 17 with preformed shading coils thereon is not in position at the welding station, rather it is to the right of the welding station as viewed in Figure 9. The transfer cylinder 101 has its piston to the right with the clamp cylinder piston 105 in the out position as shown, and the ground clamp cylinder 111 in the down position as shown. This means that the ground clamp switches 124 and 125 are in the open position, the transfer left switch 118 is open, the transfer right switch 116 is closed, the clamp-in switch 122 is open, and the clamp-out switch 120 is closed. When the control line switch 153 is closed, this provides control voltage on the lines 151 and 152 to energize the right solenoid of the transfer travel valve 131 so that air under pressure moves through this valve to urge the piston 102 to the right to maintain this piston in the position shown. The stepping relay 181 will be in the first position as shown in Figure 9, and the stepping relay 191 will also be in the first position with switch blade 193 engaging contact 194. This energizes the time delay relay 157, and after a suitable time delay the contacts 157A close. With the closing of the on-off selector switch 157, the welder will be placed in operation. After time delay relay contacts 157A close, the piston 49 will be to the left as shown, hence, the electrode reset retract switch 69 will be closed. If the welder is set to be operated, there will be electrodes in the electrode holders; and hence, the electrode detector switch 91 will be closed because of air pressure in the chamber 89, as shown in Figure 10. These aforementioned conditions will permit energization of the cycle trigger relay 158 through the normally closed contacts 159A of relay 159. Contact 158A closes as a hold-in contact. This provides a circuit through the in solenoid 130 of the transfer clamp valve 128 so that the clamp cylinder piston 105 moves in to have the yoke 106 engage one of the dogs 107.

When this clamp moves in, the clamp-out switch 120 opens and the clamp-in switch 122 closes, energizing the left solenoid 132 of the transfer travel valve 131. This causes piston rod 103 to move to the left, moving the entire conveyor 16 and cores 17 thereon so as to bring a new core to the welding station 18.

The transfer right switch 116 opens but relay 158 remains energized through contacts 158A. The transfer left switch 118 closes when the transfer cylinder piston 102 has completed its travel to the left, and this causes energization of relay 162 through the now closed contacts 158B. The contacts 162B close to energize the stepping coil 192 of stepping relay 191 through the normally closed timer contacts 171. This causes the stepping relay 191 to move from contact 194 to contact 195 to energize the electrode selector contactor 144 to close its contacts 144A. The closing of contacts 162C energizes the ground clamp valve solenoid so that the ground clamp cylinder piston 111 moves up, pushing the core 17 from the conveyor position to a welding position whereat the core 17 is in engagement and electrical contact with the grounding plate 113. This movement closes the ground clamp switches 124 and 125 so that the transfer clamp valve out solenoid 129 is energized to move outwardly the clamp cylinder piston 105. As this clamp moves outwardly, the clamp in switch 132 is opened and upon completion of the outward movement the clamp out switch 120 is closed to energize the right solenoid 133 of the transfer travel valve 131 to have the transfer cylinder piston 102 return to the right in preparation for its next cycle.

The timer 170 is tripped through the now closed contacts 162D and the ground clamp switch 124, and this timer switch blade 172 moves to the normally open contact 173 for a preset time, for example, .15 second, during which the power contactor 140 is energized to close its contacts 139. This closing, together with the closing of contacts 144A causes welding current to flow from the welding current source 26 through electrode 39 to the workpiece positioned at the welding position. The electrode 39 is positioned at a predetermined location which has a predetermined vertical spacing above the abutted ends of the workpiece. Because of this predetermined spacing, the high frequency oscillator 27 is used to strike a leader arc, and after this arc is struck the welding direct current arc will follow for the predetermined time interval to effect the welding.

The timer times out and switch blade 172 returns to the normally closed contact 171 to energize the stepping coil 192 to change the switch blade 193 to the third contact 196. This deenergizes the electrode selector contactor 144 and energizes contactor 145. The timer 170 is automatically tripped because switch 124 and contacts 162D remain closed. This tripping of the timer means that the power contactor 140 is again energized to close contacts 139 and now welding current flows to electrode 40 to cause welding of the other workpiece carried on the core 17. The timer again times out after its predetermined time interval with switch blade 172 returning to the normally closed contact 171 which again energizes the stepping coil 192 to change stepping relay switch blade 193 to the fourth contact 197. This energizes the electrode reset control relay 159. Contacts 159B thereof close to energize the stepping coil 180 of stepping relay 181. Contacts 159A open to deenergize relay 158 and also to deenergize relay 162 because of the now opened contacts 158B. Contacts 159C close to energize the time delay relay 166 which, after a predetermined time delay, closes its contacts 166A to energize reset coil 199 of stepping relay 191, resetting same and deenergizing relay 159. The opening of contacts 162C has deenergized the ground clamp valve 127 so this valve returns to its normal position causing the ground clamp cylinder piston 111 to move downwardly.

The cycle is now completed with everything as it was initially at the closing of the switch 156 and contacts 157A, except that the stepping relay 181 has advanced one step. After four such cycles, or any preset number, the stepping relay 181 will have stepped to the fifth position corresponding to the position shown in the drawing for the tap switch 168. Near the completion of such fourth cycle, when relay 159 is energized, and when the time delay relay contacts 166A close, energization will be applied through contacts 159C, contacts 158C, and the tap switch 168 and stepping relay 181 to the time delay relay 187 and the stepping coil 186. The contacts 187A immediately close and the stepping relay 186 is energized to reset stepping relay 181 to its initial position. As stated above, the movement from contact 196 to contact 197 of stepping relay switch blade 193 is only a relatively momentary contact to provide only momentary energization of relay 159. This is because the closing of contacts 159C, upon closing of contacts 166A, energizes the reset coil 199 to reset stepping relay 191 from the fourth to the first position. The deenergizing of relay 159 deenergizes the time delay relay 187; however, its contacts 187A remain closed for a predetermined time delay interval which is long enough to cause energization of the electrode reset valve 188 for a long enough period that the pneumatic cylinder piston 49 may accomplish the gauging and reset cycle.

The gauging and reset cycle is one wherein the piston 49 moves forward, the gauges 57 and 58 first move underneath the electrodes 39 and 40, and then the electrode holders 33 and 34 open. This permits the electrodes 39 and 40 to fall down upon the gauges 57 and 58 to compensate for the small amount that has been consumed during the preceding welding cycles, which in this case have been shown as four in number. When the electrode reset valve 188 is deenergized, it returns to its normal position which causes piston 49 to return to the left, and this first closes the electrode holders 33 and 34 to again grip the electrodes 39 and 40, and then subsequently retracts the gauges 57 and 58 to a retracted position whereat they will not interfere with the next welding cycle.

Therefore, it will be seen that the present invention provides a welder which resets consumable electrodes in accordance with a gauged position so that these electrodes are always in the correct position for welding cycles so as to make satisfactory successive welds on workpieces. The successive welding cycles are automatically initiated by return of the switch blade 193 to the first position at contact 194, which through conductor 200 energizes the time delay relay 157. This time delay relay may be set for a time sufficient for loading the conveyor 16 with cores 17 so that the next welding cycle may take place.

The welder of the present invention includes a cycling means which permits the entire system to cycle providing a welding cycle welding first one workpiece and then a second workpiece and then, as the stepping relay 191 moves to the fourth position, this sets up a condition whereat electrode gauging and resetting may be accomplished. Because experience has shown that the electrodes need not be gauged and reset after each welding cycle, the second stepping relay 181 is used to permit such gauging and resetting cycle to be accomplished only as experience shows it is required. In the actual welder used, every seventh or tenth welding cycle was all that was necessary for a gauging and resetting cycle. Also, it will be noted that the combination provides a synchronizing means to make sure that the gauging and resetting cycle only occurs between welding cycles and only during dropping down of the core carrying the welded workpieces, movement to the left, and bringing to the welding station another core with preformed workpieces thereon, and its movement upwardly to the welding position. This synchronization provides maximum utilization of the complete welder 15 to provide successive welding cycles which may be only two or three seconds apart for maximum productivity.

The invention also provides provision of a sequence means which includes the stepping relay to sequentially move the workpieces transversely away from the welding position, to move them longitudinally by means of the conveyor, and again move a new workpiece again transversely into welding position.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A welder for welding a workpiece, comprising, an electrode to cooperate with said workpiece, a welding station, resetting means for resetting the distance of said electrode relative to a workpiece at said welding station, a welding current source, means connected to control the flow of welding current from said source through said electrode to said workpiece, and means to cause actuation of said control means a plurality of times between actuation of said resetting means.

2. A welder for welding a workpiece, comprising, an electrode to cooperate with said workpiece, a welding station, gauging means and resetting means for gauging and resetting the position of said electrode relative to a workpiece at said welding station, a welding current source, cycling means connected to control flow of welding current from said welding current source through said electrode to said workpiece to effect the welding thereof, sequence means including said cycling means to relatively move apart the welded workpiece and said electrode and to relatively bring together another workpiece and said electrode at said welding station, and synchronizing means including said cycling means to cause actuation of said resetting means during actuation of said sequence means and between two successive periods of welding current flow.

3. A welder for welding a workpiece, comprising, an electrode to cooperate with said workpiece, a welding station, an electrode holder at said welding station for holding said electrode, gauging means and resetting means for gauging and resetting the position of said electrode relative to a workpiece at said welding station, a welding current source, cycling means connected to control flow of welding current from said welding current source through said electrode to said workpiece to effect the welding thereof, sequence means including said cycling means to relatively move apart the welded workpiece and said electrode holder and to relatively bring together another workpiece and said electrode holder at said welding station, synchronizing means including said cycling means to cause actuation of said resetting means during actuation of said sequence means and between two successive periods of welding current flow, and means to actuate said sequence means a plurality of times between actuation of said synchronizing means.

4. A welder for welding a workpiece, comprising, a welder current source, a welding station for said workpieces, an electrode to cooperate with said workpiece, an electrode holder at said welding station for holding said electrode, gauging and resetting means for gauging and resetting the position of said electrode relative to a workpiece at said welding station, cycling means connected to control welding current flow from said welder current source through said electrode to said workpiece to effect the welding thereof, sequence means including said cycling means to move the welded workpiece away from said welding station and to bring another workpiece to said welding station, and synchronizing means including said cycling means to cause actuation of said gauging and resetting means during actuation of said sequence means and between two successive periods of welding current flow.

5. A welder for welding a workpiece, comprising, a welder current source, a welding station for said workpieces, an electrode to cooperate with said workpiece, an electrode holder at said welding station for holding said electrode, gauging and resetting means for gauging and resetting the position of said electrode relative to a workpiece at said welding station, cycling means including a timer and connected to control welding current flow from said welder current source through said electrode to said workpiece to effect the welding thereof, sequence means including said cycling means to move the welded workpiece away from said welding station and to bring another workpiece to said welding station, synchronizing means including said cycling means to cause actuation of said gauging and resetting means during actuation of said sequence means and between two successive periods of welding current flow, and means to actuate said timer a plurality of times between actuation of said synchronizing means.

6. A welder for welding a workpiece, comprising, a welder current source, an electrode to cooperate with said workpiece, a conveyor means cooperating with said electrode to successively supply workpieces along a path to a welding station, an electrode holder at said welding station for holding said electrode, contactor means connected to control the flow of welding current from said welder current source to said electrode holder, gauging and resetting means for gauging and resetting the position of said electrode relative to a workpiece at said welding station, cycling means including a timer and connected to control said contactor means for a welding cycle to cause welding current to flow from said electrode to said workpiece to effect the welding thereof, sequence means including said cycling means to move said conveyor means to move the welded workpiece away from said welding station and to bring another workpiece to said welding station, synchronizing means including said cycling means to cause actuation of said gauging and resetting means during actuation of said sequence means and between two successive welding cycles of welding current flow, and means to actuate said timer a plurality of times between actuation of said synchronizing means.

7. A welder for welding a workpiece, comprising, a welder current source, an electrode to cooperate with said workpiece, conveyor means cooperating with said electrode to successively supply workpieces along a path to a welding station, an electrode holder at said welding station for holding said electrode, contactor means connected to control the flow of welding current from said welder current source to said electrode holder, gauging means for gauging the position of said electrode and movable between a retracted position and a gauging position aligned with said electrode, first power means and linkage means to actuate said gauging means and to actuate said electrode holder between closed and open positions, means including said conveyor means at said welding station establishing said workpiece and said electrode at a predetermined relative location, cycling means including a timer and connected to control said contactor means for a welding cycle to cause welding current to flow from said electrode to said workpiece to effect the welding thereof, sequence means including said cycling means to move said conveyor means to move the welded workpiece away from said welding station and to bring another workpiece to said welding station, synchronizing means including said cycling means to cause actuation of said first power means to move said gauging means from said retracted position to said gauging position, to open said electrode holder, to cause said electrode to engage said gauging means, to close said electrode holder, and to move said gauging means to said retracted position all during actuation of said sequence means and between two successive welding cycles of welding current flow, and means to actuate said timer a plurality of times between actuation of said synchronizing means.

8. A welder for welding first and second workpieces on a core, said welder comprising, a welder current source, first and second electrodes to cooperate with the first and second workpieces, conveyor means cooperating with said electrodes to successively supply cores with workpieces thereon along a path to a welding station, electrode holders at said welding station for holding said electrodes, contactor means connected to control the flow of welding current from said welder current source to said electrode holders, gauging means for gauging the position of each of said electrodes and movable between a retracted position and a gauging position aligned with each of said electrodes, first power means and linkage means to actuate said gauging means and to actuate said electrode holders between closed and open positions, means including said conveyor means at said welding station establishing said workpieces at a predetermined location relative to the ends of said first and second electrodes, respectively, cycling means including a timer and connected to control and contactor means for a welding cycle to cause welding current to flow from said first and second electrodes to said first and second workpieces, respectively, to effect the welding thereof, sequence means including said cycling means to move said conveyor means to move the core with the welded workpieces away from said welding station and to bring another core with workpieces thereon to said welding station, synchronizing means including said cycling means to cause actuation of said first power means to move said gauging means from said retracted position to said gauging position, to open said electrode holders, to cause said electrodes to engage said gauging means, to close said electrode holders, and to move said gauging means to said retracted position all during actuation of said sequence means and between two successive welding cycles of welding current flow, and means to actuate said timer a plurality of times between actuation of said synchronizing means.

9. A welder for welding a workpiece, said welder comprising, a welder current source having an output and an input, a contactor to make and break the circuit to the input of said welder current source, a timer controlling said contactor, an electrode to cooperate with said workpiece, conveyor means cooperating with said electrode to successively supply workpieces along a path to a welding station, an electrode holder at said welding station for holding said electrode, means to connect output of said welder current source to said electrode holder, gauging means for gauging the position of said electrode and movable between a retracted position and a gauging position aligned with said electrode, first power means and linkage means to actuate said gauging means and to actuate said electrode holder between closed and open positions, means at said welding station establishing said workpiece at a predetermined location relative to the end of said electrode, cycling means connected to control said timer to close said contactor for a welding cycle to cause welding current to flow from said electrode to said workpiece to effect the welding thereof, sequence means including said cycling means to move said conveyor means to move the welded workpiece away from said welding station and to bring another workpiece to said welding station, synchronizing means including said cycling means to cause actuation of said first power means to move said gauging means from said retracted position to said gauging position, to open said electrode holder, to cause said electrode to engage said gauging means, to close said electrode holder, and to move said gauging means to said retracted position all during actuation of said sequence means and between two successive welding cycles of welding current flow, and means to actuate said timer a plurality of times between actuation of said synchronizing means.

10. A welder for welding first and second workpieces carried on a core, said welder comprising, a welder current source having an output and an input, a contactor to make and break the circuit to the input of said welder current source, a timer controlling said contactor, first and second electrodes to cooperate with said workpieces, conveyor means cooperating with said electrodes to successively supply cores with workpieces thereon along a path to a welding station, electrode holders at said welding station for holding said electrodes, means to connect the output of said welder current source to said electrode holders, gauging means for gauging the position of each of said electrodes and movable between a retracted position and a gauging position aligned with each of said electrodes, first power means and linkage means to actuate said gauging means and to selectively actuate said electrode holders between closed and open positions, means at said welding station establishing said workpieces at a predetermined location relative to the ends of said first and second electrodes, respectively, cycling means connected to control said timer to close said contactor for a welding cycle to cause welding current to flow from said electrodes to said workpieces to effect the welding thereof, sequence means including said cycling means to move said conveyor to move the core with the welded workpieces away from said welding station and to bring another core with workpieces thereon to said welding station, synchronizing means including said cycling means to cause actuation of said first power means to move said gauging means from said retracted position to said gauging position, to open said electrode holders, to cause said electrodes to engage said gauging means, to close said electrode holders, and to move said gauging means to said retracted position all during actuation of said sequence means and between two successive welding cycles of welding current flow, and means to actuate said timer a plurality of times between actuation of said synchronizing means.

11. An automatic welder for welding a preformed shading coil with abutted ends on a permeable core, said automatic welder comprising, a welder current source having a direct current output and an alternating current input, a contactor to make and break the circuit to the input of said welder current source, a timer controlling said contactor, a high frequency oscillator having an output and having an input operable through said contactor from said alternating current source, an electrode to cooperate with said shading coil, conveyor means cooperating with said electrode to successively supply cores with preformed shading coils thereon along a path to a welding station, an electrode holder at said welding station for holding said electrode, means to connect in series the outputs of said welder current source and said oscillator between ground and said electrode holder, gauging means for gauging the position of said electrode and movable between a retracted position and a gauging position aligned with said electrode, first power means and linkage means to actuate said gauging means and to selectively actuate said electrode holder between closed and open positions, means at said welding station establishing the abutted ends of said shading coil a predetermined distance from the end of said electrode, means to provide a ground connection to said shading coil at said welding station, cycling means connected to control said timer to close said contactor for a welding cycle to cause welding current to flow from said electrode to said shading coil to effect the welding of the abutted ends of the preformed shading coil, sequence means including said cycling means to move said conveyor to move the core with the welded shading coil away from said welding station and to simultaneously bring another core with a preformed shading coil thereon to said welding station, synchronizing means including said cycling means to cause actuation of said first power means to move said gauging means from said retracted position to said gauging position, to open said electrode holder, to cause said electrode to engage said gauging means, to close said electrode holder, and to move said gauging means to said retracted position all during actuation of said sequence means and between two successive welding cycles of welding current flow, and means to actuate said timer a plurality of times between actuation of said synchronizing means.

12. An automatic welder for welding first and second preformed shading coils with abutted ends on a permeable core, said automatic welder comprising, a welder current source having a direct current output and an alternating current input, a power contactor to make and break the circuit to the input of said welder current source, a timer controlling said contactor, a high frequency oscillator having an output and having an input operable through said contactor from said alternating current source, first and second electrodes to cooperate with the first and second shading coils, conveyor means cooperating with said electrodes to successively supply cores with preformed shading coils thereon along a path to a welding station, electrode holders at said welding station for holding said electrodes, first and second electrode selector contactors each respectively connected in series with said first and second electrode holders, means to connect in series the outputs of said welder current source and said oscillator between ground and said first and second electrode selector contactors, gauging means for gauging the position of each of said electrodes and movable between a retracted position and a gauging position aligned with each of said electrodes, first power means and linkage means to actuate said gauging means and to selectively actuate said electrode holders between closed and open positions, means at said welding station establishing the abutted ends of said first and second shading coils a predetermined distance from ends of said first and second electrodes, respectively, means to provide a ground connection to said shading coils at said welding station, cycling means connected to control said timer and said first and second electrode selector contactors to close said power contactor and alternatively the first and second electrode selector contactors for a welding cycle to cause welding current to flow from said first and second electrodes to said first and second shading coils, respectively, to effect the welding of the abutted ends of the first and second preformed shading coils, sequence means including said cycling means to move said conveyor to move the core with the welded shading coils away from said welding station and to simultaneously bring another core with preformed shading coils thereon to said welding station, synchronizing means including said cycling means to cause actuation of said first power means to move said gauging means from said retracted position to said gauging position, to open said electrode holders, to cause said electrodes to engage said gauging means, to close said electrode holders, and to move said gauging means to said retracted position all during actuation of said sequence means and between two successive welding cycles of welding current flow, and means to actuate said timer a plurality of times between actuation of said synchronizing means.

13. An automatic welder for welding preformed shading coils with abutted ends on stators of fractional horsepower induction motors with the shading coils being of copper wire of a given diameter, said automatic welder comprising, a welder current source having a direct current output and an alternating current input, a contactor to make and break the circuit to the input of said welder current source, an electronic timer controlling said contactor, a high frequency oscillator having an output and having an input operable through said contactor from said alternating current source, an electrode to cooperate with said shading coil, conveyor means cooperating with said electrode to successively supply stators with preformed shading coils thereon along a path to a welding station, an electrode holder at said welding station for holding said electrode, means to connect in series the outputs of said welder current source and said oscillator between ground and said electrode, said electrode holder comprising jaws for selectively clamping and releasing said electrode and to hold said electrode at said welding station, gauging means for gauging the position of said electrode and movable between a retracted position and a gauging position aligned with said electrode, first power means and linkage means to selectively actuate said jaws between closed and open positions and to actuate said gauging means, a conveyor position in said path and a laterally spaced welding position of stators at said welding station with said welding position establishing the abutted ends of said shading coil a predetermined distance from the end of said electrode, second power means cooperating with said conveyor to move the stator at said welding station laterally between said conveyor position and said welding position, means to provide a ground connection to said shading coil at said welding position, cycling means connected to control said electronic timer to close the said contactor for a welding cycle to cause welding current to flow from said electrode to said shading coil to effect the welding of the abutted ends of the preformed shading coil, sequence means including said cycling means first to actuate said second power means to return said stator from said welding position to said conveyor position, second to move said conveyor to move the stator with the welded shading coil away from said welding station and to simultaneously bring another stator with a preformed shading coil thereon to said welding station and third to actuate said second power means to move the last mentioned stator to said welding position, synchronizing means including said cycling means to cause actuation of said first power means first to move said gauging means from said retracted position to said gauging position, second to open said jaws to cause said electrode to engage said gauging means, third to close said jaws, and fourth to move said gauging means to said retracted position all during actuation of said sequence means and between two successive welding cycles of welding current flow, and means to actuate said electronic timer a plurality of times between actuation of said synchronizing means.

14. An automatic welder for welding first and second preformed shading coils with abutted ends on the stator of a fractional horsepower induction motor with the shading coils being of copper wire of a given diameter, said automatic welder comprising, a welder current source having a direct current output and an alternating current input, a power contactor to make and break the circuit to the input of said welder current source, an electronic timer controlling said contactor, a high frequency oscillator having an output and having an input operable through said contactor from said alternating current source, first and second electrodes to cooperate with the first and second shading coils, conveyor means cooperating with said electrodes to successively supply stators with preformed shading coils thereon along a path to a welding station, electrode holders at said welding station for holding said electrodes, first and second electrode selector contactors each respectively connected in series with said first and second electrodes, means to connect in series the outputs of said welder current source and said oscillator between ground and said first and second electrode selector contactors, each of said electrode holders comprising jaws for selectively clamping and releasing said electrodes and to hold said electrodes at said welding station, gauging means for gauging the position of each of said electrodes and movable between a retracted position and a gauging position aligned with each of said electrodes, first power means and linkage means to selectively actuate said jaws between closed and open positions and to actuate said gauging means, a conveyor position in said path and a laterally spaced welding position of stators at said welding station with said welding position establishing the abutted ends of said first and second shading coils a predetermined distance from ends of said first and second electrodes, respectively, second power means cooperating with said conveyor to move the stator at said welding station laterally between said conveyor position and said welding position, means to provide a ground connection to said shading coils at said welding position, cycling means connected to control said electronic timer and said first and second electrode selector contactors to close said power contactor and alternatively the first and second electrode selector contactors for a welding cycle to cause welding current to flow from said first and second electrodes to said first and second shading coils, respectively, to effect the welding of the abutted ends of the first and second preformed shading coils, sequence means including said cycling means first to actuate said second power means to return said stator from said welding position to said conveyor position, second to move said conveyor to move the stator with the welded shading coils away from said welding station and to simultaneously bring another stator with preformed shading coils thereon to said welding station and third to actuate said second power means to move the last mentioned stator to said welding position, synchronizing means including said cycling means to cause actuation of said first power means first to move said gauging means from said retracted position to said gauging position, second to open said jaws to cause said electrodes to engage said gauging means, third to close said jaws, and fourth to move said gauging means to said retracted position all during actuation of said sequence means and between two successive welding cycles of welding current flow, and means to actuate said electronic timer a plurality of times between actuation of said synchronizing means.

15. An automatic welder for welding a preformed shading coil with abutted ends on the stator of a fractional horsepower induction motor with the shading coil being of copper wire of a given diameter, said automatic welder comprising, a rectifier type welder current source having a direct current output and a three-phase alternating current input, a contactor to make and break the circuit to the input of said welder current source, an electronic timer sequentially controlling said contactor, a high frequency oscillator having an output and having an input operable through said contactor from said alternating current source, an electrode to cooperate with said shading coil, conveyor means cooperating with said electrode to successively supply stators with preformed shading coils thereon along a horizontal path to a welding station, an electrode holder at said welding station for holding said electrode, means to connect in series the outputs of said welder current source and said oscillator between ground and said electrode, said electrode holder comprising, jaws for selectively clamping and releasing said electrode and to hold said electrode in a vertical position at said welding station, gauging means for gauging the vertical position of said electrode, pivoted lever means to hold said gauging means and pivotable in a horizontal plane to move said gauging means between a retracted position and a gauging position physically beneath said electrode, first power means and linkage means to selectively actuate said jaws between closed and open positions and to actuate said pivotal lever means, a lower conveyor position in said horizontal path and an upper welding position of stators at said welding station with said upper welding position establishing the abutted ends of a shading coil a predetermined vertical distance from the lower end of said electrode, second power means cooperating with said conveyor to move the stator at said welding station vertically between said lower conveyor position and said upper welding position, means to provide a ground connection to said shading coil at said welding position, a stepping relay connected to control said electronic timer to close said contactor for a welding cycle to cause welding current to flow from said electrode to said shading coil for a predetermined time interval to effect the welding of the abutted ends of the preformed shading coil, sequence means including said stepping relay first to actuate said second power means to return said stator from said welding position to said conveyor position, second to move said conveyor to move the stator with the welded shading coil away from said welding station and to simultaneously bring another stator with a preformed shading coil thereon to said welding station and third to actuate said second power means to move the last mentioned stator to said welding position, synchronizing means including said stepping relay to cause actuation of said first power means first to move said gauging means from said retracted position to said gauging position, second to open said jaws to permit said electrode to fall down onto said gauging means, third to close said jaws, and fourth to move said gauging means to said retracted position all during actuation of said sequence means and between two successive welding cycles of welding current flow, and means to actuate said electronic timer a plurality of times between actuation of said synchronizing means.

16. An automatic welder for welding first and second preformed shading coils with abutted ends on the stator of a fractional horsepower induction motor with the shading coils being of copper wire of a given diameter, said automatic welder comprising, a rectifier type welder current source having a direct current output and a three-phase alternating current input, a power contactor to make and break the circuit to the input of said welder current source, an electronic timer sequentially controlling said power contactor, a high frequency oscillator having an output and having an input operable through said contactor from said alternating current source, first and second electrodes of identical diameters to cooperate with the first and second shading coils, conveyor means cooperating with said electrodes to successively supply stators with preformed shading coils thereon along a horizontal path to a welding station, electrode holders at said welding station for holding said electrodes, first and second electrode selector contactors each respectively connected in series with said first and second electrode holders, means to connect in series the outputs of said welder current source and said oscillator between ground and said first and second electrode selector contactors, each of said electrode holders comprising jaws for selectively clamping and releasing said electrodes and to hold said electrodes in a vertical position at said welding station, gauging means having first and second gauges for gauging the vertical position of each of said electrodes, pivoted lever means to hold said gauging means and pivotable in a horizontal plane to move said gauging means between a retracted position and a gauging position physically beneath each of said electrodes, first power means and linkage means to selectively actuate said jaws between closed and open positions and to actuate said pivoted lever means, a lower conveyor position in said horizontal path and an upper welding position of stators at said welding station with said upper welding position establishing the abutted ends of said first and second shading coils a predetermined vertical distance from the lower ends of said first and second electrodes, respectively, second power means cooperating with said conveyor to move the stator at said welding station vertically between said lower conveyor position and said upper welding position, means to provide a ground connection to said shading coils at said welding position, a stepping relay connected to control said electronic timer and said first and second electrode selector contactors to close said power contactor and alternatively the first and second electrode selector contactors for a welding cycle to cause welding current to flow from said first and second electrodes to said first and second shading coils, respectively, for first and second predetermined time intervals to effect the welding of the abutted ends of the first and second preformed shading coils, sequence means including said stepping relay first to actuate said second power means to return said stator from said welding position to said conveyor position, second to move said conveyor to move the stator with the welded shading coils away from said welding station and to simultaneously bring another stator with preformed shading coils thereon to said welding station and third to actuate said second power means to move the last mentioned stator to said welding position, synchronizing means including said stepping relay to cause actuation of said first power means first to move said gauging means from said retracted position to said gauging position, second to open said jaws to permit said electrodes to fall down onto said gauging means, third to close said jaws, and fourth to move said gauging means to said retracted position all during actuation of said sequence means and between two successive welding cycles of welding current flow, and means to actuate said electronic timer a plurality of times between actuation of said synchronizing means.

17. A welder for welding a workpiece, comprising, an electrode to cooperate with said workpiece, a welding station, an electrode holder at said welding station for holding said electrode, gauging means and resetting means for gauging and resetting the position of said electrode relative to a workpiece at said welding station, a welding current source, control means connected to control flow of welding current from said welding current source through said electrode to said workpiece to effect the welding thereof, and electrode detector means to detect the absence of an electrode in said electrode holder to override control of said control means.

18. A welder for welding a workpiece, comprising, a welder current source, an electrode to cooperate with said workpiece, conveyor means cooperating with said electrode to successively supply workpieces along a path to a welding station, an electrode holder at said welding station for holding said electrode, contactor means connected to control the flow of welding current from said welder current source to said electrode holder, gauging and resetting means for gauging and resetting the position of said electrode relative to a workpiece at said welding station, cycling means including a timer and connected to control said contactor means for a welding cycle to cause welding current to flow from said electrode to said workpiece to effect the welding thereof, sequence means including said cycling means to move said conveyor means to move the welded workpiece away from said welding station and to bring another workpiece to said welding station, synchronizing means including said cycling means to cause actuation of said gauging and resetting means during actuation of said sequence means and between two successive welding cycles of welding current flow, means to actuate said timer a plurality of times between actuation of said synchronizing means, and electrode detector means to detect the absence of an electrode in said electrode holder to prevent flow of welding current.

19. A welder, comprising, an electrode holder for an electrode cooperable with a workpiece, resetting means for resetting the distance of said electrode relative to said workpiece, means connected to control welding current through said electrode, and means to cause actuation of said control means a plurality of times between actuation of said resetting means.

20. A welder, comprising, an electrode holder for an electrode, resetting means for resetting the position of said electrode relative to said holder, a welding current source, means connected to control the flow of welding current from said source through said electrode, synchronizing means to cause actuation of said resetting means only between two successive periods of welding current flow, and means to cause welding current flow a plurality of times between actuation of said synchronizing means.

References Cited in the file of this patent

UNITED STATES PATENTS

| 1,773,892 | Toleik | Aug. 26, 1930 |
| 2,357,038 | Whitesell | Aug. 29, 1944 |
| 2,419,817 | Bruno | Apr. 29, 1947 |
| 2,636,147 | Anderson | Apr. 21, 1953 |

FOREIGN PATENTS

| 349,804 | Germany | Mar. 8, 1922 |